United States Patent [19]

Barr et al.

[11] 4,131,142

[45] Dec. 26, 1978

[54] SAFETY VALVE FOR FUEL DISPENSERS INCLUDING VAPOR RECOVERY SYSTEMS

[75] Inventors: Robert H. Barr, Dubuque, Iowa; John D. Eckel, Hazel Green, Wis.

[73] Assignee: A. Y. McDonald Mfg. Co., Dubuque, Iowa

[21] Appl. No.: 790,054

[22] Filed: Apr. 22, 1977

[51] Int. Cl.² ............................................. F16K 17/36
[52] U.S. Cl. .................................. 141/302; 137/68 R; 137/77; 137/595; 251/77; 251/303
[58] Field of Search ................... 137/68 R, 69, 70, 72, 137/73, 75-77, 595; 251/77, 298, 303; 141/302; 220/204

[56] References Cited

U.S. PATENT DOCUMENTS

| 828,236 | 8/1906 | McElroy | 251/77 |
|---|---|---|---|
| 1,267,314 | 5/1918 | Brogniez | 137/595 |
| 1,970,629 | 8/1934 | Scott | 137/595 |
| 3,030,982 | 4/1962 | Navara | 137/595 X |
| 3,268,202 | 8/1966 | Murray et al. | 251/303 X |
| 3,489,160 | 1/1970 | Moore | 137/68 R X |
| 3,874,427 | 4/1975 | Tiggelbeck | 141/52 |

Primary Examiner—Martin P. Schwadron
Assistant Examiner—Richard Gerard
Attorney, Agent, or Firm—Wegner, Stellman, McCord, Wiles & Wood

[57] ABSTRACT

A safety valve for use in fuel dispensing systems including a vapor recovery system and having a valve body, first and second inlets in the body, first and second outlets in the body, first and second, separate, fluid flow passages in the body and extending between respective ones of the first and second inlets and outlets, two valve seats in the body, one in each of the passages, a shaft extending through and rotatable in the body adjacent the valve seats, first and second clapper valves in the body, one in each passage, each clapper valve having a limited lost motion connection to the shaft to be rotatable therewith, with limited lost motion, between positions seated against and spaced from the associated valve seat, a pair of springs, one for each valve, biasing the associated valve towards its associated seat, and a holding device for holding the shaft in a position of rotation within the body wherein the valves are spaced from their associated seats, and for sensing an unsafe condition in the vicinity of the valve body for releasing the shaft so that the springs will cause the valves to close.

6 Claims, 4 Drawing Figures

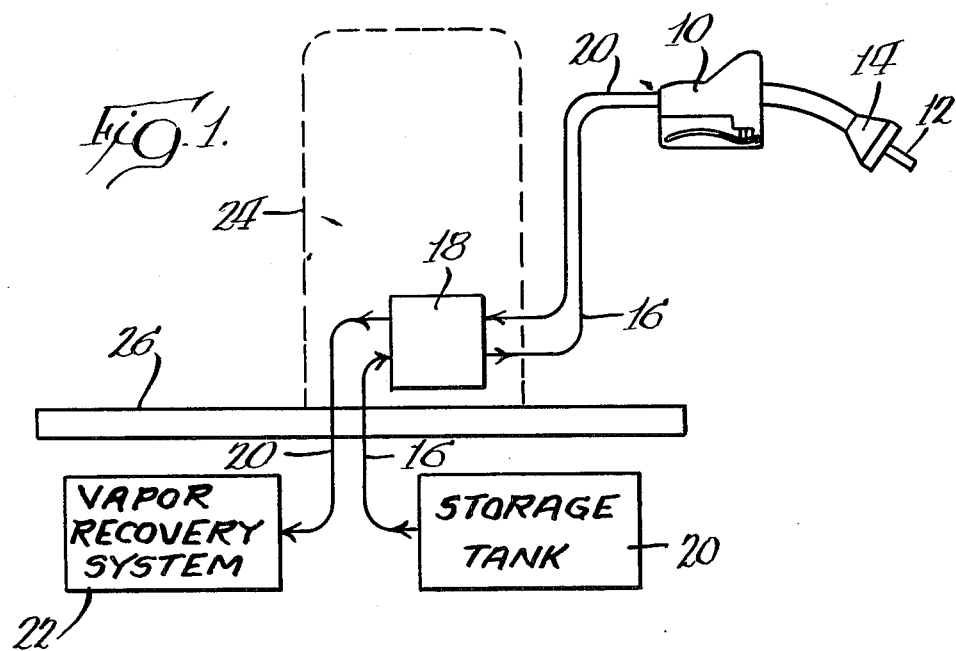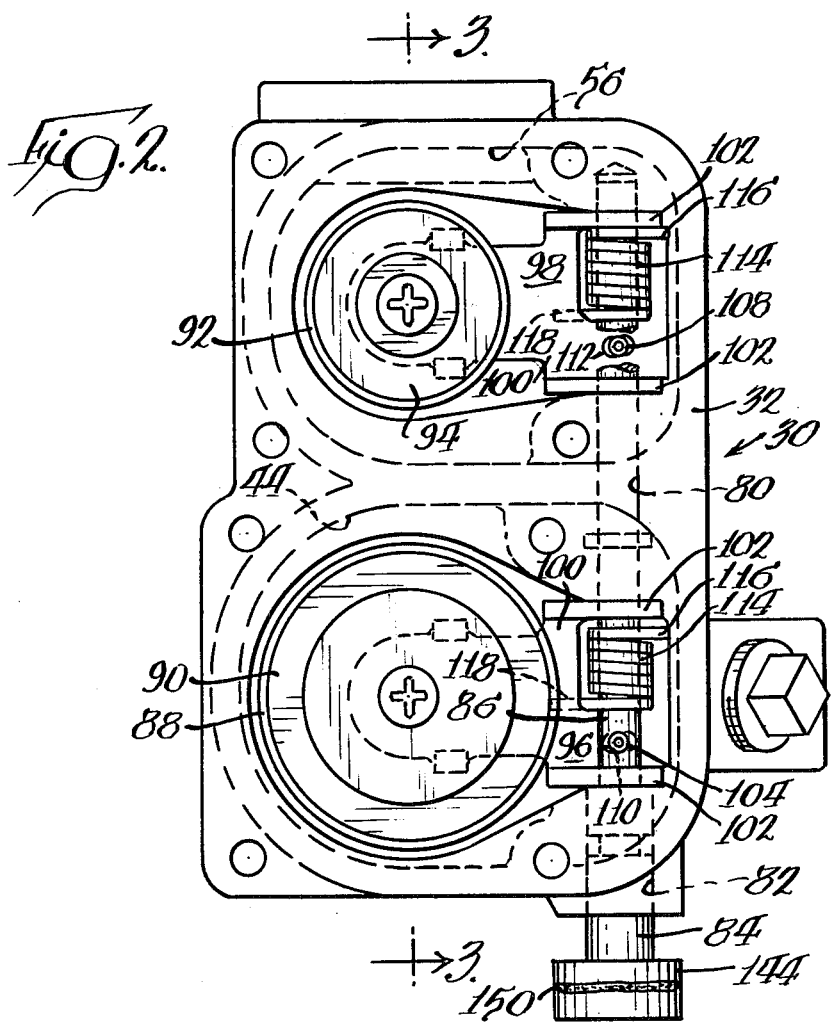

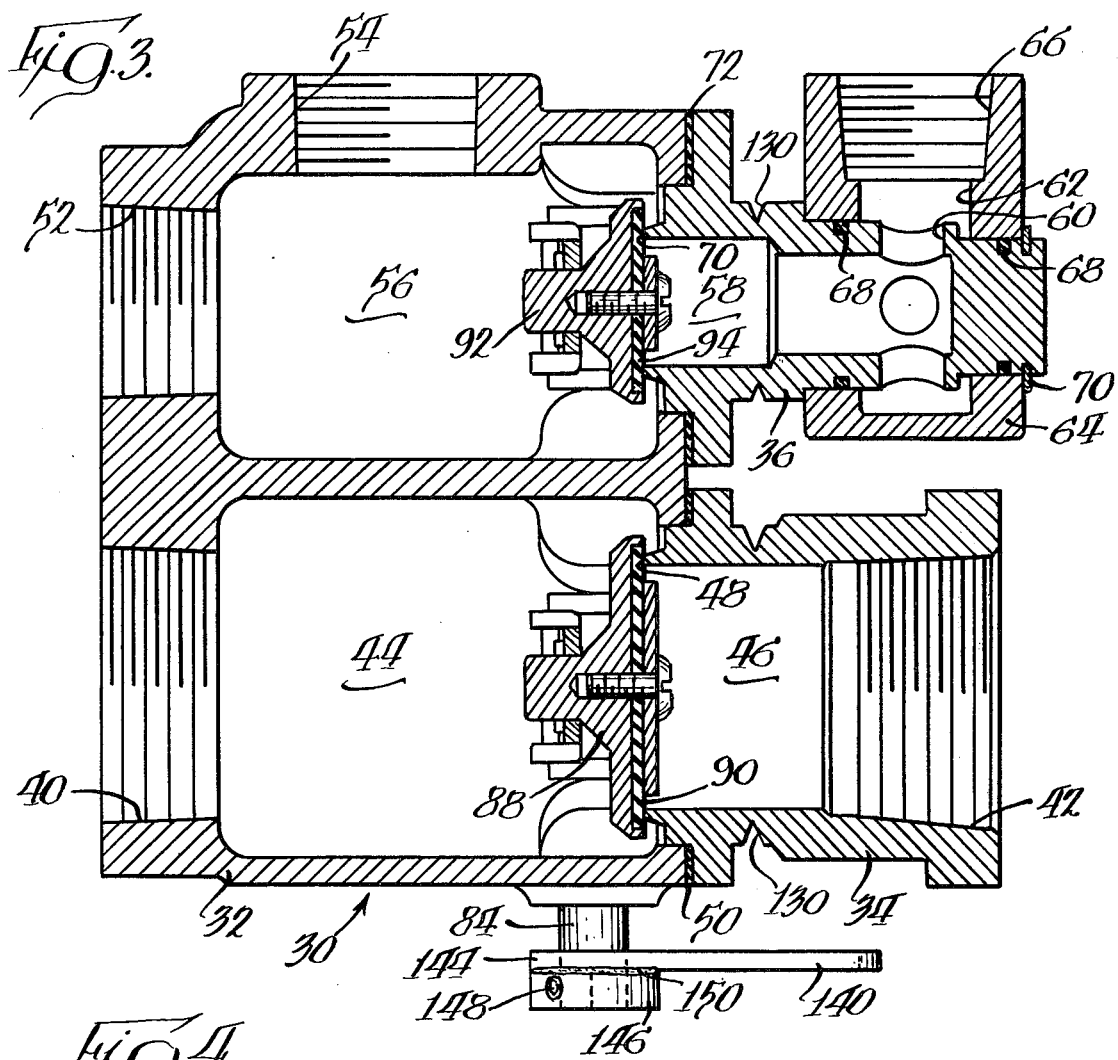

SAFETY VALVE FOR FUEL DISPENSERS INCLUDING VAPOR RECOVERY SYSTEMS

BACKGROUND OF THE INVENTION

This invention relates to safety valves for use in fuel dispensing systems and, more specifically, to such fuel dispensing systems including vapor recovery systems.

Fuel dispensing systems at, for example, vehicle service stations, have long been provided with a variety of safety devices to preclude minor accidents occurring in the vicinity of the fuel pumps from resulting in large fuel spills which could lead to large fires and/or explosions. In the usual case, a safety valve is located in the fuel dispensing line, at the pump and is secured to the pump island. The safety valve includes a normally closed valve which is latched in an open condition to allow fuel to flow. Typically, the latch includes a fusible link so that an elevated temperature in the vicinity of the safety valve as, for example, caused by a small fire, would result in the melting of the link and the closing of the valve.

Such valves also typically include an intentionally weakened portion spanned by the link maintaining the valve open such that if sufficient force is applied to the safety valve body, as, for example, by a collision of a vehicle with the pump, the valve body will rupture so that the latch link is displaced, allowing the valve to close.

Recently, increasing environmental concerns regarding air pollution by hydrocarbons has resulted in the large scale introduction of vapor recovery systems in such fuel dispensers. Typically, the fuel dispensing nozzle is provided with a vapor collector which collects vapors driven from a fuel tank during the filling process and/or liquid fuel driven into the collector as by splashing or overfilling of the tank. Such vapors and liquid fuel are conveyed, usually by a vacuum, to vapor recovery systems which condense the vapor and return the same in a liquid form along with any liquid fuel collected to the fuel storage tank.

Because the vapor recovery lines, when in operation, are conducting a flammable vapor and/or liquid, it is highly desirable to provide means for precluding vapor and/or liquid in the vapor recovery system from spilling or otherwise exiting the system in the case of an accident in the vicintiy of the pump to minimize or eliminate fire and explosion danger.

SUMMARY OF THE INVENTION

It is the principal object of the invention to provide a new and improved safety valve for use in fuel dispensing systems including vapor recovery systems.

More specifically, it is an object of the invention to provide such a safety valve which is disposable in both the fuel flow path and the vapor recovery path and which is inexpensive to manufacture, and yet totally reliable.

An exemplary embodiment of the invention achieves the foregoing objects in a valve construction including a valve body having first and second inlets. The body also includes first and second outlets and first and second, separate fluid flow passages which extend between respective ones of the first and second inlets and outlets. Two valve seats are disposed in the body, one in each of the passages, and a shaft extends through and is rotatable in the body adjacent the valve seat. First and second clapper valves are disposed in the body, one in each passage. Each clapper valve has a limited lost motion connection to the shaft to be rotatable therewith with limited lost motion between positions seated against and spaced from the associated valve seat. A pair of means, one for each valve, bias the associated valve towards its associated seat and means are provided for normally holding the shaft in a position of rotation within the body wherein the valves are spaced from their associated seats and for sensing an unsafe condition in the vicinity of the valve body for releasing the shaft so that the biasing means will cause the valves to close. By reason of the provision of the limited lost motion connections between the valves and the shaft and the use of individual biasing means for each of the valves, positive seating of each valve is obtained with minimal concern for tolerances at the point of connection of each valve to the shaft.

In a highly preferred embodiment, the body includes an intentionally weakened portion which is adapted to rupture upon the application of a predetermined force to the body and the holding and sensing means comprise a latch interconnecting the shaft and the body across the intentionally weakened portion from the shaft, the latch being displaceable from one of the shaft and the body upon rupture of the body to release the shaft and/or a fusible link for releasing the shaft at an elevated temperature.

A preferred embodiment of the invention contemplates that the limited lost motion connections between the valves and the shaft comprise pin and slot connections.

It is preferred that the valve be utilized in a fuel dispensing system including a vapor recovery system wherein a fuel dispenser is connected to the first outlet and a fuel supply connected to the first inlet. A vapor collector is located on the fuel dispenser and is connected to the second inlet and the vapor recovery means are connected to the second outlet.

A vapor collector is located on the fuel dispenser and is connected to the second inlet and the vapor recovery means are connected to the second outlet.

Other objects and advantages will become apparent from the following specification taken in connection with the accompanying drawings.

DESCRIPTION OF THE DRAWINGS

FIG. 1 is a schematic view of a fuel dispensing system including a vapor recovery system embodying a valve made according to the invention;

FIG. 2 is a view of a portion of the valve with part of the body removed for clarity;

FIG. 3 is a sectional view of the valve if taken approximately along the lines 3—3 of FIG. 2 with all parts of the valve assembled; and FIG. 4 is a side elevation of the valve.

DESCRIPTION OF THE PREFERRED EMBODIMENT

An exemplary embodiment of a fuel dispensing system including a vapor recovery system utilizing a valve made according to the invention is illustrated in somewhat schematic form in FIG. 1 as it would be used in, for example, a vehicle service station. The same includes a hand-held valve 10 with a dispensing nozzle 12 adapted to be introduced into a fuel tank. The nozzle 12 is surrounded with a vapor collector 14 which may be in the form of a hood or the like and closes about the fuel tank of the vehicle being filled. A line 16 extends from the safety valve 18 of the present invention for delivering fuel from a storage tank 20 to the nozzle 12 when the valve 10 is open. Of course, a pump (not shown) will be employed for this purpose.

A second line 20 extends from the valve 10 for conducting vapors collected by the collector 14 to the valve 18 and thence to a vapor recovery system 22.

The usual pump housing is illustrated in dotted lines at 24 and, as is well known, will be stationarily mounted on, for example, an island 26.

The safety valve 18 may be contained in whole or in part within the pump housing 24 and, in the usual course, will be secured by any suitable means to the support for the housing 24, here the island 26. The valve 18 normally will allow fluid communication between the valve 10 and the storage tank 20 as well as the hood 14 and the vapor recovery system 22 whenever the valve 10 is open. However, in the event of an unsafe condition occurring in the vicinity of the valve 18, it is operative to close both the lines 16 and 20 to halt further fluid flow. Typically, the unsafe conditions for which the valve 18 is operative to halt fluid flow includes a small fire resulting in an elevated temperature in the vicinity of the pump 24 or a collision of a vehicle (not shown) with the pump housing 24 of sufficient force as to bend or possibly break rigid plumbing involved with either of the lines 16 and 20.

Turning now to FIGS. 2-4, the valve 18 and the means thereof which perform the above identified function are illustrated in detail. The valve 18 includes a valve body, generally designated 30, formed of a base casting 32 and two additional castings 34 and 36 which are secured to the base casting 32 as by cap screws 38 (FIG. 4).

The base casting 32 includes a fuel inlet 40, while the casting 34 includes a fuel outlet 42. The inlet 40 is in fluid communication with an enlarged cavity 44 within the base casting 32 while the outlet 42 is in fluid communication with a bore 46 within the casting 32. The cavity 44 and the bore 46 define a first fluid flow passage interconnecting the inlet 40 and the outlet 42 and the end of the casting 34 remote from the outlet 42 defines a circular, planar valve seat 48.

Leakage from the fluid flow passage defined by the cavity 44 and the bore 46 where the castings 32 and 34 are united is precluded by a gasket 50.

The base casting 32 includes a pair of outlets 52 and 54, only one of which wll be used in a given installation in the usual case. The other, typically, will be plugged. The outlets 52 and 54 are in fluid communication with a cavity 56, also within the base casting.

The casting 36 includes a central, stepped bore 58 which, together with the cavity 56, define a second fluid flow passage. The stepped bore 58 terminates in a plurality of radial bores which are in fluid communication with a bore 62 in an outlet casting 64. The outlet casting 64 includes a tapped end 66 for connection to the vapor collector side of the line 20 and is swivel mounted on the casting 36 in a conventional fashion utilizing seals 68 and a retainer 70.

As with the casting 34, the casting 36 has the end of its bore 58 remote from the inlet 66 terminating in a valve seat 70 which is circular and planar and extends into the cavity 56. In addition, the valve seats 70 and 48 are nominally coplanar. A gasket 72 is located at the interface of the casting 36 and the base casting 38.

Referring now to FIG. 2, a bore 80 extends through the base casting 32 and passes through each of the cavities 56 and 44 in adjacency to the valve seats 48 and 70. One end of the bore 80 is enlarged as at 82 and receives a stub shaft 84. Received within a bore in the stub shaft 84 within the bore 82 is an elongated shaft 86 which is rotatably received within, and extends the length of the bore 80, thereby passing through both of the cavities 44 and 56.

Within the cavity 44 is a clapper valve 88 having a resilient sealing surface 90 which is adapted to abut and seal against the valve seat 48. A similar clapper valve 92, also having a resilient sealing surface 94, is disposed within the cavity 56 and located to seal against the seat 70.

Mounting brackets 96 and 98 are located within the cavities 44 and 56, respectively, and secured to the sides of the respective clapper valves 88 and 92 remote from the sealing surfaces 90 and 94 and extend within the respective cavities 44 and 56 toward the shaft 86. Each of the mounting brackets 96 and 98 includes a flat base 100 and extending from the base 100 generally transverse thereto, is a pair of spaced, apertured ears 102. The shaft 86 extends through the apertured ears 102 of each bracket 96 and 98 thereby pivotally mounting the associated clapper valve 88 and 92.

In addition, the shaft 86 mounts two pins 104 and 108 which extend generally transversely to the axis of rotation of the shaft 86 and which are received in elongated slots 110 and 112 in the base 100 of the brackets 96 and 98, respectively. Thus, the clapper valves 88 and 92 are mounted for rotation with the shaft 86 by virtue of the limited lost motion connections established by the pin 104 and the slot 110 and the pin 108 and the slot 112.

Disposed between the ears 102 of each mounting bracket 96 and 98 is a coil spring 114. One end 116 of each coil spring 114 firmly abuts a side of the corresponding cavity 44 or 56 while the other end 118 is in abutment with the side of the base 100 of the corresponding bracket 96 remote from the sealing surface 90 or 94 of the corresponding clapper valve 88 or 92. Consequently, the clapper valves 88 and 92 are biased towards the seated position illustrated in FIG. 3, individually, by the corresponding coil springs 114. The valves 88 and 92 may be moved to positions remote from their corresponding valve seats 48 and 70 through rotation of the stub shaft 84 against the bias of the springs 114. When the stub shaft 84 is released, each valve will close completely even if the two are slightly misaligned with each other on the shaft 86 or even if the valve seats 48 and 70 are not exactly coplanar due to the fact that each valve is individually biased by its own separate spring 114 and the fact that the limited lost motion connection of each valve to the shaft allows each valve to shift angularly with respect to the other about the axis of the shaft 86 within the limits permitted by the lost motion connections.

Consequently, positive sealing is obtained without requiring exacting tolerances in the location of the valve seats 48 and 70 with respect to each other or the disposition of the valves 88 and 92 with respect to each other at their point of connection to the shaft 86.

As best seen in FIGS. 3 and 4, each of the castings 34 and 36 includes an inwardly directed, peripheral groove 130 which serves as an intentional weakened portion in the body 30. If a force in excess of some predetermined amount is applied to the body and, for example, due to a collision of a vehicle with the housing 24, the body 30 will fracture or deform at the grooves 130.

Referring now to FIG. 4, a boss 132 extends from the casting 34 on the side of the groove 130 closest to the outlet 42. A generally L-shaped spring finger 134 is pivotally mounted 132 by means of a bolt 136 and remote from its point of connection to the boss 132 terminates in a cylindrical end 138. A latching lever 140 includes a semi-circular recess 142 which may receive the cylindrical end 138 of the spring finger 134. The end 144 of the latch 140 remote from the recess 142 is freely disposed about the stub shaft 84.

A short sleeve or collar 146 is received on the end of the stub shaft 84 and keyed thereto by means of a set screw 148. The sleeve 146 is in substantial abutment with the end 144 of the latch 140 and a layer of solder 150 is located at the interface of the two to secure the latch 140 to the collar 146. The solder layer 150 is formed of any suitable solder which fuses, at some desired temperature, and its composition is conventional.

In use, the latch 140 is pivoted in a counterclockwise direction to the position illustrated in FIG. 4 and by reason of the soldered connection to the collar 146, will rotate the stub shaft 84, and thus the shaft 86, to a position wherein both the clapper valves 88 and 92 will be open. The spring finger 134 is located as illustrated in FIG. 4 with its cylindrical end 138 disposed in the recess 142 to prevent clockwise movement of the shaft due to the biasing of the spring 114. In the event a small fire appears in the vicinity of the valve 18, when the predetermined temperature at which the solder layer 150 will melt is attained, the connection between the latch 140 and the collar 146 will be severed, with the result that the springs 114 will cause the respective valves 88 and 92 to move to the position illustrated in FIG. 3 to seat to thereby halt fluid communication between the various portions of the lines 16 and 20.

Alternately, should a vehicle strike the pump housing 24 with sufficient force as to bend plumbing for the line 16 therein, the valve body 30 will rupture at the weakened portions 130. Because the spring finger 134 spans the weakened portion 130, rupture or severe deformation thereat will cause the cylindrical end 138 of the spring finger 130 to become displaced from the recess 142. As a result, the latch 140 will no longer be effective and both valves will close under the influence of their corresponding springs 114. And, as noted previously, positive seating of both valves 88 and 92 will occur due to the unique use of the limited lost motion connections to the shaft and the individual biasing of each valve.

Similar action, if desired, responsive to bending of the line 20 may be obtained by mechanically linking the castings 34 and 36.

While the inventive valve has been described as having swivel and female threaded connections, those skilled in the art will recognize that male thread, union fitting, and dresser (slip fit) coupling connections, and even barb type hose connectors on the vapor side, may be employed in lieu thereof.

Finally, while the invention has been described in connection with a vacuum assisted vapor recovery system, it may be advantageously employed with balance type vapor recovery systems wherein the vapor being displaced from a tank upon filling is returned directly to the fuel storage tank; and no restriction to either system is intended.

We claim:

1. A safety valve for use in fuel dispensing systems including a vapor recovery system, said valve comprising:

a valve body;
    first and second inlets in said body;
    first and second outlets in said body;
    first and second, separate, fluid flow passages in said body and extending between respective ones of said first and second inlets and outlets;
    two valve seats in said body, one in each of said passages;
    a shaft extending through and rotatable in said body adjacent said valve seats;
    first and second clapper valves in said body, one in each passage, each clapper valve having a limited lost motion connection to said shaft to be rotatable therewith, with limited lost motion, between positions seated against and spaced from the associated valve seat;
    a pair of means, one for each valve, biasing the associated valve towards its associated seat; and
    means for normally holding said shaft in a position of rotation within said body wherein said valves are spaced from their associated seats and for sensing an unsafe condition in the vicinity of the valve body for releasing said shaft so that said biasing means will cause said valves to close.

2. The safety valve of claim 1 wherein said holding and sensing means comprises a fusible link.

3. The safety valve of claim 1 wherein said body includes an intentionally weakened portion adapted to rupture upon the application of a predetermined force to said body and said holding and sensing means comprises a latch interconnecting to said shaft and said body across said intentionally weakened portion from said shaft, and being displaceable from one of said shaft and said body upon rupture of said body to release said shaft.

4. The safety valve of claim 1 wherein said body includes an intentionally weakened portion adapted to rupture upon the application of a predetermined force to said body and said holding and sensing means comprises a latch interconnecting to said shaft and said body across said intentionally weakened portion from said shaft, and being displaceable from one of said shaft and said body upon rupture of said body to release said shaft, said latch further including a fusible link.

5. The safety valve of claim 1 wherein said limited lost motion connections comprise pin and slot connections.

6. A fuel dispensing system including a vapor recovery system including a safety valve for use in fuel dispensing systems including a vapor recovery system, said valve comprising:

a valve body;
    first and second inlets in said body;
    first and second outlets in said body;
    first and second, separate, fluid flow passages in said body and extending between respective ones of said first and second inlets and outlets;
    two valve seats in said body, one in each of said passages;
    a shaft extending through and rotatable in said body adjacent said valve seats;
    first and second clapper valves in said body, one in each pssage, each clapper valve having a limited lost motion connection to said shaft to be rotatable therewith, with limited lost motion, between positions seated against and spaced from the associated valve seat;

a pair of means, one for each valve, biasing the associated valve towards its associated seat;

means for normally holding said shaft in a position of rotation within said body wherein said valves are spaced from their associated seats and for sensing an unsafe condition in the vicinity of the valve body for releasing said shaft so that said biasing means will cause valves to close; and further including a fuel dispenser connected to said first outlet;

a fuel supply connected to said first inlet;

a vapor collector on said fuel dispenser and connected to said second inlet; and vapor recovery means connected to said second outlet.

* * * * *